(12) United States Patent  
Greaves

(10) Patent No.: US 9,348,937 B2
(45) Date of Patent: May 24, 2016

(54) FISHEYE VIEWER AND WIGGLY ICON

(75) Inventor: P. David Greaves, Amsterdam (NL)

(73) Assignee: ELSEVIER B.V., Amsterdam (NL)

( * ) Notice: Subject to any disclaimer, the term of this patent is extended or adjusted under 35 U.S.C. 154(b) by 1791 days.

(21) Appl. No.: 10/957,299

(22) Filed: Sep. 30, 2004

(65) Prior Publication Data

US 2006/0069996 A1  Mar. 30, 2006

(51) Int. Cl.
*G06F 3/048*  (2013.01)
*G06F 17/30*  (2006.01)

(52) U.S. Cl.
CPC ................................ *G06F 17/30905* (2013.01)

(58) Field of Classification Search
USPC ........................................................ 715/711
See application file for complete search history.

(56) References Cited

U.S. PATENT DOCUMENTS

| | | | |
|---|---|---|---|
| 5,960,411 A * | 9/1999 | Hartman et al. ................. | 705/26 |
| 6,181,838 B1 | 1/2001 | Knowlton | |
| 6,271,840 B1 * | 8/2001 | Finseth et al. ................. | 715/513 |
| 6,683,633 B2 * | 1/2004 | Holtzblatt et al. ............. | 715/854 |
| 6,883,138 B2 * | 4/2005 | Rosenholtz et al. .......... | 715/526 |
| 6,993,726 B2 * | 1/2006 | Rosenholtz et al. .......... | 715/835 |
| 7,047,502 B2 * | 5/2006 | Petropoulos et al. ......... | 715/781 |
| 2001/0047373 A1 * | 11/2001 | Jones et al. .................... | 707/515 |
| 2002/0052891 A1 * | 5/2002 | Michaud et al. ........... | 707/501.1 |
| 2002/0152222 A1 | 10/2002 | Holbrook | |
| 2002/0163545 A1 * | 11/2002 | Hii ................................. | 345/838 |
| 2002/0191031 A1 * | 12/2002 | Ricard .......................... | 345/838 |
| 2003/0014415 A1 * | 1/2003 | Weiss et al. .................... | 707/10 |
| 2003/0160830 A1 | 8/2003 | DeGross | |
| 2004/0095371 A1 * | 5/2004 | Haynes et al. ................. | 345/711 |
| 2004/0205514 A1 * | 10/2004 | Sommerer et al. .......... | 715/501.1 |
| 2004/0205633 A1 * | 10/2004 | Martinez et al. .............. | 715/526 |
| 2005/0091612 A1 * | 4/2005 | Stabb et al. .................... | 715/816 |
| 2005/0177784 A1 * | 8/2005 | Andrews et al. .............. | 715/513 |
| 2005/0235203 A1 * | 10/2005 | Undasan ....................... | 715/526 |
| 2006/0069996 A1 * | 3/2006 | Greaves ........................ | 715/708 |

FOREIGN PATENT DOCUMENTS

| | | |
|---|---|---|
| EP | 1426880 | 6/2004 |
| JP | 2002312401 | 10/2002 |

OTHER PUBLICATIONS

Laura Gutman, Macromedia Dreamweaver MX 2004 Demystified, Published: Nov. 3, 2003, Chapters 6 and 13.*
www.tenbyten.org, "10x10/100 Words and Pictures that Define the Time", by J. J. Harris, Apr. 14, 2005.
www.samuelwan.com, "Fisheye Menu in Flash MX", by S. Wan, May 2002.
www.hornbyrailways.com, "View Hornby Live Steam Instruction Booklet", pp. 1-6.

(Continued)

*Primary Examiner* — William Bashore
*Assistant Examiner* — Henry Orr
(74) *Attorney, Agent, or Firm* — Dinsmore & Shohl LLP

(57) ABSTRACT

Users scanning listings of items are able to easily and quickly read each item in a list without actually leaving the list, as would be the case when following a regular hypertext link. The contents of each link are displayed in a separate, smaller viewing window that maintains a stable position and is of a size appropriate for viewing both the contents of the window and the list of items at the same time. The viewing window is activated via selection of an icon associated with an item in the list (each item preferably has at least one associated icon). This icon also is used to navigate the content of each link.

30 Claims, 7 Drawing Sheets

(56) References Cited

OTHER PUBLICATIONS

Kopetzky T et al: "Visual preview for link traversal on the World Wide Web", Computer Networks, Elsevier Science Publishers B.V., Amsterdam, NL, vol. 31, No. 11-16, May 17, 1999, pp. 1525-1532, ISSN: 1389-1286, see abstract and p. 406, paragraphs 3.6,4-p. 413, paragraph 5.3.

Nanno: "Zero-click: a system to support web browsing", http://www.lr.pi.titech.ac.jp/~nanno/paper/w3c/zero-click.html.

Stanyer D et al: "Improving Web usability with the link lens", Computer Networks, Elsevier Science Publishers B.V., Amsterdam, NL, vol. 31, No. 11-16, May 17, 1999, pp. 1533-1544, ISSN: 1389-1286, see abstract, left hand column, line 4—p. 1543, left hand column, line 8, and figure 7.

Weinreich H et al: "Concepts for improved visualization of Web link attributes", Computer Networks, Elsevier Science Publishers B.V., Amsterdam, NL, vol. 33, No. 1-6, Jun. 2000, pp. 403-416, ISSN: 1389-1286, see abstract and p. 1528 right hand column, lines 1-17.

Held, Bernd, "Windows-2000 Das bhv TascYienbuch," 1: Auflage, (c) 2000 ,2002, Apr. 3, 2002; Verl. Moderne Industrie, ISBN 378266-801.0-3, S. 3, 4, 18.1-196, 210-214.

\* cited by examiner

```
+------------------------------+
| CODE FOR FISHEYE VIEWER      |
|   ......................     |
|   ......................     |
|   ......................     |
+------------------------------+
|////////////////////////////|
+------------------------------+
| DATA FOR EACH WIGGLY ICON    |
|                              |
| data for Wiggly Icon #1      |
| data for Wiggly Icon #2      |
| data for Wiggly Icon #3      |
|   ......................     |
|   ......................     |
|   ......................     |
| data for Wiggly Icon #N      |
+------------------------------+
|////////////////////////////|
+------------------------------+
| DATA FOR THE HTML PAGE       |
|                              |
| xxxxxxxxxxxxxxxxxxxxxxxxx    |
| xxxxxxxxxxxxxxxxxxxxxxxxx    |
| xxxxxxxxxxxxxxxxxxxxxxxxx    |
| xxxx Wiggly Icon #1 xxxx     |
| xxxx Wiggly Icon #2 xxxx     |
| xxxx Wiggly Icon #3 xxxx     |
|   ......................     |
|   ......................     |
|   ......................     |
| xxxx Wiggly Icon #N xxxx     |
| xxxxxxxxxxxxxxxxxxxxxxxxx    |
| xxxxxxxxxxxxxxxxxxxxxxxxx    |
| xxxxxxxxxxxxxxxxxxxxxxxxx    |
+------------------------------+
```

FIG. 3

```
+----------------------------+
| WIGGLY ICON                |
+----------------------------+
| link #1 coords = (x1, y1)  |   => link activates Viewer(x1, y1)
+----------------------------+
| link #2 coords = (x2, y2)  |   => link activates Viewer(x2, y2)
+----------------------------+
| link #3 coords = (x3, y3)  |   => link activates Viewer(x3, y3)
+----------------------------+
+    ........................+
+    ........................+
+    ........................+
+----------------------------+
| link #N coords = (xN, yN)  |   => link activates Viewer(xN, yN)
+----------------------------+
```

FIG. 6 http://labs.elsevier.com/project/fisheye/list.pl - Microsoft In...

SCIENCE DIRECT

510

Polyhedron

CLOSE

Anion-directed structural diversity in the complexes of Cd(II)-arylazoimidazole: synthesis, spectral characterization and crystal structure B. G. Chanda, U. S. Raya, G. Mostafab, Tian-Huey Lub, Lawrence R. Falvelloc, Tatiana Solerc, Milagres Tomasc and C. Sinha Summary
The work describes the differences in the structures of cadmium(II)-arylazoimidazole (Cd(II)-RaaiR') complexes depending on the nature of the anions. Because of weak coordinating ability of $ClO_4$ - a tetrakis derivative, $[Cd(RaaiR')_4](ClO_4)_2$ has been obtained compared to Cl - which gives a bis-complex, $Cd(RaaiR')2Cl_2$. Use of Cd(NO3)2 as a starting material has yielded a tetratragonal channel structure. Nitrate and interstitial water molecules assemble into a supramolecule having a square-grid and brick-wall topology, and the cation takes seat in the groove.

*Arylazoimidazoles; Cadmium (II) complexes; Square grid; X-ray structure*

Software and compilation © 2003 ScienceDirect. All rights reserved.

FIG. 8 http://labs.elsevier.com/project/fisheye/article.pl?id=polyh...

SCIENCE DIRECT

520

Polyhedron

CLOSE

Volume 22 (2003), Issue 24, Pages 3161-3169
Copyright © 2003 Elsevier Science Ltd. All rights reserved

Anion-directed structural diversity in the complexes of Cd(II)-arylazoimidazole: synthesis, spectral characterization and crystal structure B. G. Chanda, U. S. Raya, G. Mostafab, Tian-Huey Lub, Lawrence R. Falvelloc, Tatiana Solerc, Milagres Tomasc and C. Sinha

*Department of Chemistry, University of Burdwan, Burdwan 713104, India*
*Department of Physics, National Tsing-Hua University, Hisnchu 300, Taiwan, ROC*
*Department of Inorganic Chemistry and Aragón Materials Science Institute, University of Zaragoza, Plaza San Francisco s/n, E- 50009, Zaragoza, Spain*

Abstract

Cadmium(II) complexes of 1-alkyl-2-(arylazo)imidazoles [RaaiR' (where R=H (a), Me (b); R'=Me (1/3/5/7), Et (2/4/6/8)] are described in this work. Three representative complexes of the series, [Cd(HaaiMe)$_2$Cl$_2$] (3a), [Cd(HaaiEt)$_4$](ClO$_4$)$_2$ (6a) and [Cd(HaaiMe)$_4$](NO$_3$)$_2$ · 2H$_2$O (7a), have been characterized by single crystal X-ray diffraction measurements. In these complexes, cadmium is seated at the center of a

FISHEYE VIEWER AND WIGGLY ICON

FIELD OF THE INVENTION

This invention relates to selecting and reviewing electronic files and their contents.

BACKGROUND OF THE INVENTION

The ability to aggregate and search electronic documents and other electronic files (generically referred to herein as "items") on an increasingly large scale necessitates development of techniques to supplement existing procedures for search and discovery.

In the past, when one viewed a list of electronic documents, for example, one would be forced to leave and return to the list each time one wished to view one of the documents in the list. What are needed are methods and systems for providing effective and rapid browsing of the contents of lists—methods and systems that don't require a reader to leave and return to a search result list (or other list) in order to examine the contents of a listed item.

Ideally, such methods or systems would replicate to some extent the experience of picking up a traditional paper-based journal or book and flicking through pages—either to find specific items or to see more generally whether there is anything worthy of closer examination. One strong advantage of this method is that one does not lose control over the current context; that is, as one holds the book one retains full control over the book while scanning; one can go backward, forward, investigate in more detail, and so on, with very little effort.

Such systems or methods would also enable users to scan more items with less fatigue, and reduce the likelihood of over-reliance on automated retrieval methods (which cannot know what is in the mind of an individual user) They would also potentially lead to serendipitous discovery of useful material in ways not currently feasible by machine.

SUMMARY

The present invention, in one aspect, comprises a method and system for enabling a user to "look into" an item in a list using a "mouse rollover" that controls display of the item's contents (or related data) in a pop-up window. This method and system satisfies the requirements and provides the benefits described above.

Users scanning listings of articles or other items are able to easily and quickly read each article in a list without actually leaving the list, as would be the case when following a regular hypertext link. The contents of each link are displayed in a separate, smaller viewing window that maintains a stable position and is of a size appropriate for viewing both the contents of the window and the list of articles at the same time. The viewing window is activated via selection of an icon associated with an item in the list (each item preferably has at least one associated icon). This selection is preferably carried out by simply moving the mouse over the chosen icon. This icon also is used to navigate the content of each link. The viewing window is called a "fisheye viewer" herein since it allows users to "look into" the contents of an item without leaving the list, while the icon is called a "wiggly icon" since moving the mouse over the icon facilitates navigation of content.

The present invention provides a powerful technique for displaying any information that might be contained within a paper or other item containing visual data, including image data, text, links (especially multiple links), tables, and graphs; and particularly for image data and text that might effectively encapsulate and summarize the contents of a paper. Indeed, alternate embodiments enable a user to customize a viewer to deliver those parts of a document of greatest use to the user.

A preferred embodiment of the invention also comprises a "wiggly icon" that a user "wiggles" a mouse over to find additional material regarding the listed item.

In one aspect, the invention comprises two main components: a fisheye viewer for viewing content in a popup window, and a wiggly icon for activating the fisheye viewer and navigating content.

These two components, although distinct, preferably work closely together to facilitate navigation of links in a list: a user looks at the fisheye viewer (which displays data in a pop-up window) while using the mouse to navigate content by means of the wiggly icon (or other icons). Thus, the user's required attention to the icons is minimal. Once the icon is located, the user can focus attention on the information displayed in the viewer.

In one aspect, the invention comprises a computer system for improved list browsing, comprising: one or more web servers; one or more electronic databases in communication with the one or more web servers; and a user computer in communication with at least one of the one or more web servers via an electronic computer network; wherein the at least one of the web servers in communication with the user computer is operable to transfer software to the user computer, the user computer is operable to run the software, the software is operable to provide at least one visual display of data regarding an item selected by a user from a list, and the item is selected by the user by selecting an icon associated with the item.

In various embodiments: (a) the icon is associated with two or more displays of data and each of the displays corresponds to a selected subregion of the icon; (b) the data is displayed in a pop-up window; (c) the pop-up window is small enough to allow a user to simultaneously view the window and at least a portion of the list; (d) the item is a document; (e) the display of data comprises an image of the item; (f) the display of data comprises data summarizing contents of the item; (g) each of the two or more displays is displayed in a pop-up window when the subregion corresponding to that display is selected by the user; and (h) at least two icons are associated with the item.

In another aspect, the invention comprises a method for displaying data regarding items in a list, comprising the steps of: displaying a list of items; displaying icons, wherein each icon is associated with one of the items and each icon is divided into one or more subregions; in response to a user selection of a subregion of one of the icons associated with one of the items, displaying a pop-up window containing data regarding the one of the items.

In various embodiments: (a) the data displayed in the pop-up window comprises contents of the one of the items; (b) the data displayed in the pop-up window comprises data summarizing contents of the one of the items; (c) the data displayed in the pop-up window comprises data selected from contents of the one of the items; (d) the user selection is performed by moving a mouse cursor over the subregion; (e) the pop-up window is small enough to avoid entirely covering the list; (f) the pop-up window is placed to avoid interference with the icons; and (g) one of the items is a document.

In another embodiment, one of the icons is divided into two or more different subregions and the method further comprises the steps of: in response to a selection of a first subregion, displaying the pop-up window containing first data regarding the one of the items; and in response to a selection of a second subregion, displaying the pop-up window containing second data regarding the one of the items, wherein the second data is different from the first data.

In another aspect, the invention comprises a method for selecting and viewing data associated with items in a list, comprising the steps of: viewing a list of items displayed on a computer screen; selecting a first subregion of an icon associated with one of the items; viewing in a pop-up window a first set of data regarding the one of the items; selecting a second subregion of the icon, wherein the second subregion is different from the first subregion; and viewing in the pop-up window a second set of data regarding the one of the items, wherein the second set of data is different from the first set of data.

In various embodiments: (a) the steps of selecting a first subregion and selection a second subregion comprise placing a mouse cursor over the first and second subregions, respectively; (b) the first set of data comprises data summarizing contents of the one of the items; (c) the first set of data comprises data selected from contents of the one of the items; (d) the pop-up window is displayed upon the mouse cursor being placed over the first or second subregions; (e) the pop-up window is displayed in a manner that allows a user to simultaneously view at least a portion of the list; and (f) one of the items is a document.

BRIEF DESCRIPTION OF THE DRAWINGS

FIG. 3 is a diagram that graphically depicts data returned by a Web server when a user invokes a Web page with wiggly icons:

FIG. 4 is a diagram that graphically depicts a simple interaction between a wiggly icon and a fisheye viewer.

Figure 5:
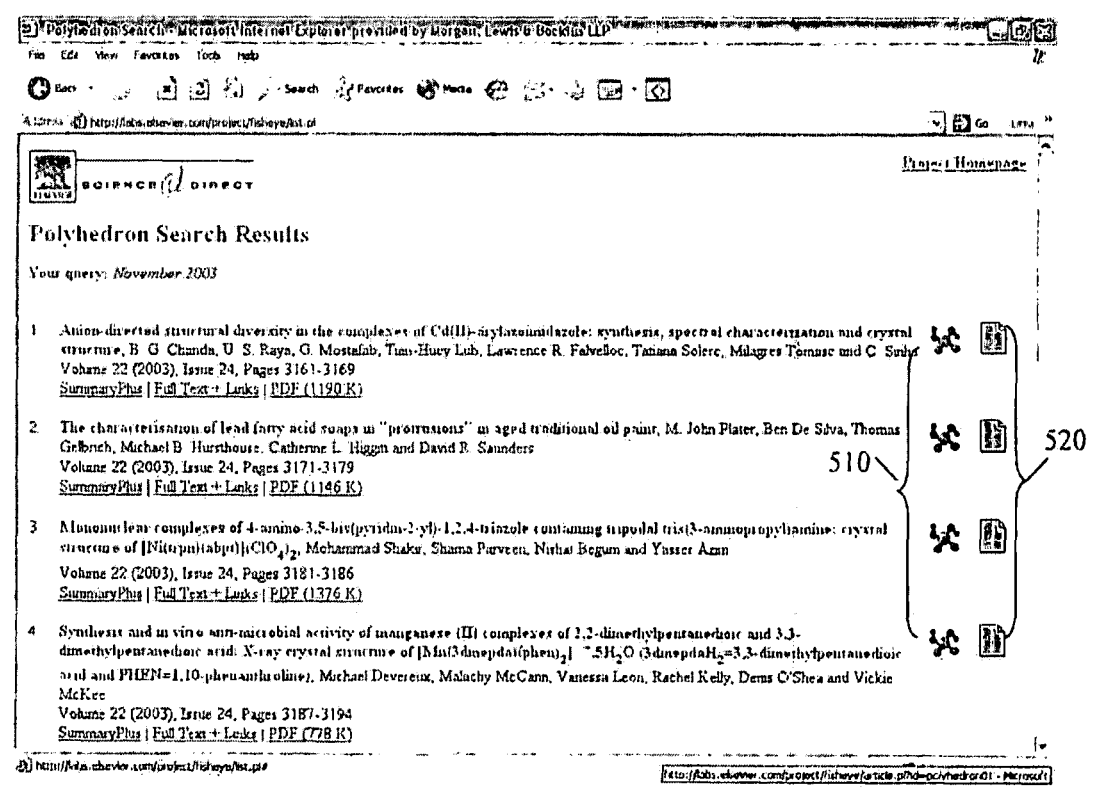

FIG. 5 is a screenshot of a Web page containing a list of articles and corresponding icons.

FIG. 6 is a screenshot of a fisheye viewer pop-up window.

FIG. 8 is a screenshot of another fisheye pop-up window.

DETAILED DESCRIPTION OF PREFERRED EMBODIMENTS

Preferred embodiments are described below within the framework of a list of documents, such as would be the result of a search or as a contents list for an issue of a journal. However, this technique is equally applicable to hypertext references in regular text (for example, for references to related articles or relevant content present in a database), and more generally to any electronic files containing visual data, as will be recognized by those skilled in the art.

Fisheye Viewer

The fisheye viewer preferably comprises a separate, stable window used to view material at the remote end of one or more hyperlinks in a wiggly icon.

Properties of preferred embodiments comprise one or more of the following:

size sufficiently large for content being viewed;
size sufficiently small for listing page to be viewed simultaneously;
positioned with minimal overlap with the listing so that the respective contents of the listing and fisheye viewer can be viewed simultaneously;
position constant from link to link;
position can be changed by the user;
properties (such as overall size) customizable by user;
instances may be created via wiggly icon;
content selection via mouseover on wiggly icon (or other icon); and
navigation effected via mouseover on wiggly icon (or other icon).

Figure 1:
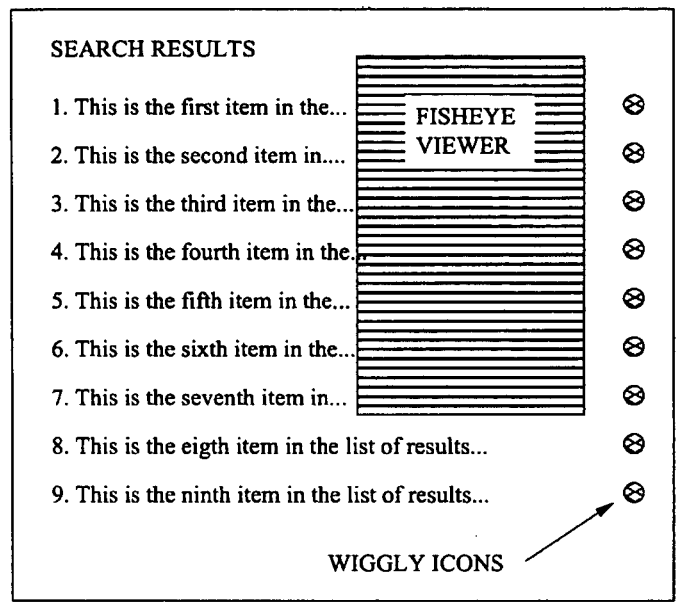
FIG. 1 is a diagram that shows schematically the general layout of the wiggly-icon and fisheye viewer combination.

FIG. 1 is a schematic view of the preferred structure of the fisheye viewer within the scope of a list of links. FIG. 1 shows schematically the general layout of the wiggly-icon and fisheye viewer combination. In particular:

the fisheye viewer is superimposed on the list of articles;
the fisheye viewer is placed so that both the list of articles and the wiggly icons can be clearly seen; and
the fisheye viewer is placed relative to the wiggly icons such that the user can move from icon to icon while looking at the contents of the fisheye viewer; i.e., users do not get distracted by trying to locate each icon.

Wiggly Icon

The wiggly icon preferably is an icon of appropriate shape and size for each link in a list, and is used both to activate the fisheye viewer and to navigate content therein.

Properties of a preferred embodiment comprise one or more of the following:

on startup mouseover creates new instance of fisheye viewer;
mouseover selects content in existing instance of fisheye viewer;
wiggling mouse over current icon facilitates navigation of content; and
icon has generic shape specific to each type of content.

Figure 2:
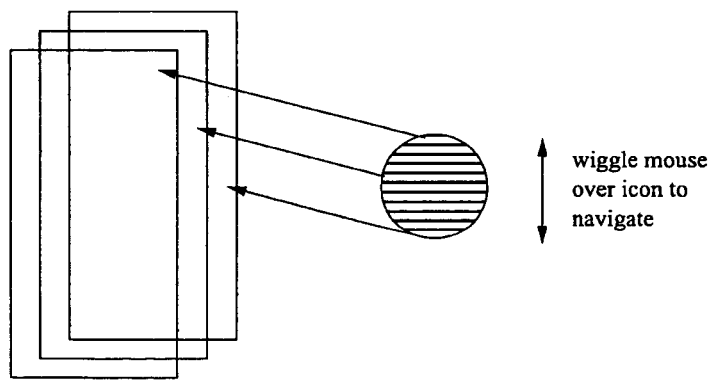
FIG. 2 is a diagram that shows schematically how the wiggly-icon is used to navigate content.
Figure 7:
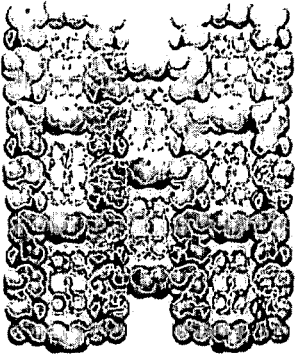
FIG. 7 is a screenshot of another fisheye pop-up window.

FIG. 2 is a schematic view of the preferred structure of a simple wiggly icon and illustrates how a mouseover is able to navigate content. In particular:

moving the mouse over the wiggly icon, normally in an up-and-down direction, stimulates movement from one page to another;
there is a direct relation between the part of the icon the mouse hovers over and the actual page being viewed;
the size of the wiggly icon does not change from one item in the list to another; and
there are no navigational aids on the wiggly icon itself, since a user focuses on the fisheye viewer.

The icon is called "wiggly" since the user is able to navigate content by simply wiggling the mouse over an icon using intuitive hand movements, without any detailed navigational aids other than looking at the direct result of these movements in the fisheye viewer.

Preferably, wiggly icons are arranged in a ordered fashion to help make movement from one icon to another intuitive to the user. For lists of items, wiggly icons preferably are aligned vertically down a page.

FIGS. 5-8 illustrate a preferred embodiment used in the context of a simple search. The fisheye viewer is activated via a "mouseover" on the two icon columns 510 and 520 on the right-hand side of the screen depicted in FIG. 5.

By moving the mouse up and down a wiggly chemical icon 510 a user can view both the chemical structure (see FIG. 7) and a brief textual summary (see FIG. 6) with rapid response. Mousing over a plain text icon 520 displays the article itself (see FIG. 8). The preferred strategy is to skim vertically down the chemical icons 510, moving right to the text icon 520 whenever more detailed information is required.

An alternate embodiment uses keystrokes (instead of a mouse) for navigation. However, keystrokes could be a less favorable solution than icons when browsing different kinds of articles or offering a choice of content types. Keystrokes normally only function in the left-right and up-down directions, while the mouse is able to facilitate movement in basically any direction, thereby giving more flexibility and control to the user.

In practice, the mouse-over technique is especially useful for browsing new contents lists, and for creating and reviewing short-listed results of an extensive search. Since the user navigates by viewing the results of wiggling the mouse, a facility of use is thereby attained that retains the interest of the user and promotes serendipitous discovery.

Programming Notes

1. Operational Environment

A preferred operational environment for the fisheye viewer and wiggly icon comprises any standards-conforming Web browser, such as Internet Explorer, Mozilla, or Opera. Content preferably is fed to the Web browser from a Web server, and only at the request of the user.

1.1. Client Requirements

The role of the client is to display information retrieved from the Web server. For ease of use, technology readily available with standard Web browsers and on all common operating systems (Microsoft Windows, Macintosh and Linux) preferably is used. It is preferable (but not required) to limit implementation at the user end to programming languages that run on all systems (for example, Javascript or Java).

1.2. Server Requirements

Any standards-conforming Web server, such as Apache and Microsoft Windows IIS, will suffice. The role of the Web server is to provide all required information to the client.

2. Operation

The preferred mode of operation is as follows:

User downloads an HTML page containing wiggly icons to a web browser. Other icons would also work, if linked to the fisheye viewer, but for ease and simplicity of discussion we henceforth refer generically to all such icons as "wiggly icons." When the icon is truly "wiggly," that will be clear from the context.

User moves mouse over first selected wiggly icon to activate fisheye viewer and present data corresponding to that icon.

User moves mouse over next wiggly icon selected to display data for that particular icon.

User similarly activates all remaining wiggly icons of interest on page and similarly displays data for each one.

User closes fisheye viewer when done browsing HTML page.

After closing fisheye viewer, it may be re-activated by once again moving mouse over any wiggly icon on the downloaded HTML page.

Regarding the content presented in the fisheye viewer, it is important to note (although this will be recognized by those skilled in the art) that the viewer may be used to view more than just an image or a page from (or summary of) a paper, and there may be a need for several views activated by wiggly icons. In any given list, there might be short "comments" articles and "errata", as well as full-length articles, their respective lengths being reflected in the number of hyperlinks within the wiggly icons. Moreover, the fisheye viewer may display data comprising any selection of material contained within a document (for example, text, images, and hyperlinks).

Generally speaking, the viewer may be used to view any visual data stored in an electronic file. For example, those skilled in the art will recognize that the invention may be used to view a video clip stored in a video file.

We now describe the above procedure in more detail.

2.1. Downloading the Page with Wiggly Icons

When the user invokes a Web page with wiggly icons:

The Web server returns (see FIG. 3):
  HTML page containing wiggly icons, each Icon holding a number of hyperlinks to the fisheye viewer.
  Data for each wiggly icon appearing on the HTML page.
  Code for the fisheye viewer that is able to operate on any user's computer.

2.2. Activating the Wiggly Icon

After the page has been downloaded into the browser, client has all components required for the fisheye viewer and wiggly icon:

The complete HTML page with wiggly icons.
Data for each wiggly icon.
Code for the fisheye viewer.

The fisheye viewer is activated as follows:

User moves mouse over wiggly icon, which contains one or more hyperlinks to the code for fisheye viewer.

Software for fisheye viewer activates fisheye viewer window when mouse passes over the first hyperlink it touches within the current wiggly icon.

Software for fisheye viewer retrieves the data for this first hyperlink activated within the current wiggly icon and presents that data in a fisheye viewer window.

As the mouse cursor moves from one hyperlink to another within a current wiggly icon, the data for each hyperlink is accordingly displayed in the fisheye viewer window.

When the next wiggly icon is selected, the software for fisheye viewer similarly retrieves the data for each hyperlink activated and presents that data in the fisheye viewer.

When moving the mouse both within current wiggly icon and when moving from one icon to another, the fisheye viewer preferably remains in its current position.

The fisheye viewer may be repositioned and resized by the user, after which its position and size will remain stable until further adjustment is made or until the window itself is closed.

The fisheye viewer is closed by activating a hyperlink in the fisheye viewer itself.

3. Technical Details 3.1 Wiggly Icon

The task of the wiggly icon is to both activate and pass information to the fisheye viewer so that it can retrieve and display data for that wiggly icon.

The wiggly icon preferably is based on standard browser technology such as "Imagemap", a graphic image partitioned into "hot areas" which can be activated using a mouse, each specific area being hyperlinked to a specific destination.

The wiggly icon is thus made by partitioning an icon into an Imagemap containing series of "hot areas" defined in terms of their x- and y-coordinates expressed in pixels.

This enables one to define for each "hot area" a URL in terms of its coordinates (see FIG. 4 for a simple schematic demonstration), with the effect that when the mouse is passed over a particular "hot area", the fisheye viewer is activated with the coordinates of that "hot area" passed as parameters to the code.

The coordinates of the activated "hot area" are in turn translated by the code into the precise location of the data for the wiggly icon, and that data is appropriately formatted and delivered by the Web server when the HTML page is downloaded.

The number of "hot areas" depends on the number of pages specific to each wiggly icon, and the number of pages may differ from one wiggly icon to another. Thus the data for each wiggly icon is formatted by the Web server before delivery to the user.

3.2 Fisheye Viewer

The task of the fisheye viewer is to retrieve data corresponding to the information it receives via each wiggly icon hyperlink, and to present this data to the user within a (preferably) small window on the user's monitor.

The code for the fisheye viewer preferably is delivered to the user each time a page with wiggly icons is downloaded. As described in subsection 3.1, the fisheye viewer is activated when the mouse passes over the wiggly icon.

The detailed procedure is as follows:

When the mouse first passes over any wiggly icon on a newly downloaded Web page, the code downloaded with the page creates the special small window for viewing the data and then, using the coordinates of the current "hot area" in the current wiggly icon passed to it at activation time, retrieves the data for that hyperlink and presents them to the user.

When moving the mouse over any given wiggly icon, as each different "hot area" of the icon is activated, the coordinates of each new "hot area" are passed to the fisheye viewer, which in turn retrieves the data for the hyperlink and presents that data to the user. This is shown schematically in FIG. 4, where the wiggly icon is on the left-hand side and Viewer(x, y) is the code for the fisheye viewer activated via a hyperlink with parameters x, y which define the position of a "hot area" within a wiggly icon.

3.3 Data for the Fisheye Viewer

So far we have described presentation of textual data in the fisheye viewer and a single "bulk" download of both the HTML page and data for the fisheye viewer. However, other embodiments can be deployed, either alone or in combination.

The choice of embodiment depends on the nature of the network connection within which the fisheye viewer and wiggly icon are being used, and on the nature of the data being transferred. This is especially true with regard to minimizing response times and optimizing overall efficiency, 3.3.1 Download on Demand.

Instead of downloading all data in one step (i.e., complete HTML page plus data for wiggly icons), one may connect to the Web server each time a wiggly icon is activated, and only at that time download information for either the current "hot area" or all "hot areas" of that particular wiggly icon.

3.3.2 Image Data.

In addition to textual data, one may also download image data, in which case one could either download and cache all images at the same time (as when downloading the page holding the wiggly icons), or just download images for either the current "hot area" or all "hot areas" of each particular wiggly icon.

3.4 Code for the Fisheye Viewer

So far we have discussed the situation where the code for the fisheye viewer is downloaded with each HTML page containing wiggly icons. Alternatively, one may supply the code on a session basis, where the code is downloaded once and remains in place for the current session, or one may supply the code separately as a download for users to install for more permanent use on their machines.

While the present invention has been illustrated and described above regarding various embodiments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A computer system for improved list browsing, comprising:
one or more web servers; and
a user computer in communication with at least one of said one or more web servers via an electronic computer network;
wherein:
said at least one of said web servers in communication with said user computer is operable to transfer software to said user computer,
said user computer is operable to run said software, and
said software is operable to, at said user computer:
display a list of items and an icon associated with an item in said list, wherein said item is associated with a file containing a plurality of pages and said icon is formatted based on the plurality of pages associated with said file,
provide a visual display distinct from said list and said icon,
display a first page of said file in said visual display in response to an indication that a user interface pointer has been positioned over said icon, and
display a next sequential page of said file in said visual display in lieu of said first page in response to an indication that said user interface pointer has been moved from an initial position of said icon to a different position within a region of said icon;
wherein no navigational aid is provided within the icon to guide said movement of said user interface pointer.

2. A system as in claim 1, wherein said icon is associated with two or more pages of said file and each of said two or more pages corresponds to a subregion of said icon.

3. A system as in claim 1, wherein said visual display is a pop-up window.

4. A system as in claim 3, wherein said pop-up window is small enough to allow a user to simultaneously view said window and at least a portion of said list.

5. A system as in claim 1, wherein said item is a document.

6. A system as in claim 1, wherein said file comprises an image of said item.

7. A system as in claim 1, wherein said file comprises a summary of contents of said item.

8. A system as in claim 1, wherein said file comprises data selected from contents of said item.

9. A system as in claim 2, wherein each of said two or more pages is displayed in a pop-up window when the subregion corresponding to that page is selected by said user.

10. A system as in claim 1, wherein at least two icons are associated with said item.

11. A method for displaying data associated with items in a list, comprising the steps of:
displaying a list of items and an icon associated with an item in said list, wherein said item is associated with a file containing a plurality of pages and data for said icon is formatted by one or more web servers based on the plurality of pages associated with said file;

in response to an indication that a user interface pointer has been positioned over said icon, displaying a pop-up window containing a first sequential page; and in response to an indication that a user interface pointer has been moved over said icon, displaying in the pop-up window a next sequential page in lieu of said first sequential page;

wherein said sequential pages include a chemical structure diagram and textual chemical data.

12. A method as in claim 11, wherein said file comprises contents of said item.

13. A method as in claim 11, wherein said file comprises a summary of contents of said item.

14. A method as in claim 11, wherein said file comprises data selected from contents of said item.

15. A method as in claim 11, wherein said user interface pointer is a mouse cursor.

16. A method as in claim 11, wherein said pop-up window is small enough to avoid entirely covering said list.

17. A method as in claim 11, wherein said pop-up window is placed to avoid interference with said icon.

18. A method as in claim 11, wherein said one item is a document.

19. A method as in claim 11, wherein said icon is divided into two or more different subregions and further comprising the steps of:

in response to a selection of a first subregion, displaying said pop-up window containing a first sequential page; and in response to a selection of a second subregion, displaying said pop-up window containing a second sequential page in lieu of said first sequential page.

20. A method for selecting and viewing data associated with items in a list, comprising the steps of:

displaying a list of items and an icon on a computer screen, wherein said icon is associated with an item in said list, and further wherein said item is associated with a file containing a plurality of pages and said icon is formatted by one or more web servers based on the plurality of pages associated with said file;

in response to an indication that a user interface pointer has been positioned over a first subregion of said icon, displaying-in a pop-up window a first page; and in response to an indication that a user interface pointer has been positioned over a second subregion of said icon, displaying in said pop-up window a next sequential page in lieu of said first page;

wherein no navigational aid is provided within the icon to guide the movement of said user interface pointer from the first subregion to the second subregion of the said icon.

21. A method as in claim 20, wherein said user interface pointer is a mouse cursor.

22. A method as in claim 20, wherein said file comprises a summary of contents of said item.

23. A method as in claim 20, wherein said file comprises data selected from contents of said item.

24. A method as in claim 21 wherein said pop-up window is displayed upon said mouse cursor being placed over said first or second subregions.

25. A method as in claim 20, wherein said pop-up window is displayed in a manner that allows a user to simultaneously view at least a portion of said list.

26. A method as in claim 20, wherein said item is a document.

27. A method comprising:

displaying an icon associated with a document file containing a plurality of pages, wherein data for said icon is formatted by one or more web servers based on the plurality of pages associated with said file;

accessing data describing content of the plurality of pages of said document file, said data mapped to corresponding pages of said document file;

in response to an indication that a user interface pointer has been positioned over said icon, displaying a pop-up window containing a first page of said document file; and in response to an indication that said user interface pointer has been moved from an initial position of said icon to a different position within a region of said icon, displaying in the pop-up window a next page of said document file in lieu of said first page;

wherein no navigational aid is provided within the icon to guide said movement of said user interface pointer.

28. A method as in claim 27, further comprising, in response to an indication that said user interface pointer has been moved from an initial position of said icon to a different position within a region of said icon, displaying in the pop-up window a subsequent page of said document file in lieu of said next page, said subsequent page being a page immediately following, in said document file, said next page.

29. A computer system comprising:

a computer for receiving the results of a search request and presenting said results on a display with individual responses associated with one or more icons;

a mouse for moving a position indicator across said display to permit a user to identify a position within the display;

a computer for tracking the mouse and for associating a location of said icons with said mouse and for tracking the movement of said position indicator in association with said icon;

said tracking computer issuing a command to open a screen window based on a first movement of said position indicator to a location on said screen associated with one of said icons, wherein said screen window is populated with information corresponding to said icon and the search result associated with said icon;

wherein said tracking computer further detects back and forth movement of said position indicator over said icon to display a series of pages, each comprising different information, associated with said icon and the search result associated with said icon, each of said pages being displayed individually in sequence in said display window, and movement between displayed information is triggered by said back and forth movement and said movement is between at least two sub-regions within said icon;

wherein no navigational aid is provided within the icon to guide said movement of said position indicator.

30. A computer system for improved list browsing, comprising:

a user computer in communication with one or more web servers;

wherein the user computer in communication with said one or more web servers receives, from said one or more web servers, a list of items associated with a query and an icon associated with an item in said list, where said item is associated with a file containing a plurality of pages and data for said icon is formatted by said one or more web servers before receipt by said user computer based on the plurality of pages associated with said file, and further wherein said user computer is operable to:
   display a visual display distinct from said list and said icon,
   display a first page of said file in said visual display in response to an indication that a user interface pointer has been positioned over said icon, and
   display a next sequential page of said file in said visual display in response to an indication that said user interface pointer has been moved from an initial position of said icon to a different position of said icon;
wherein no navigational aid is provided within the icon to guide said movement of said user interface pointer.

* * * * *